June 16, 1964  C. G. NOBLE  3,137,049
CABLE CONNECTOR
Filed Dec. 4, 1962
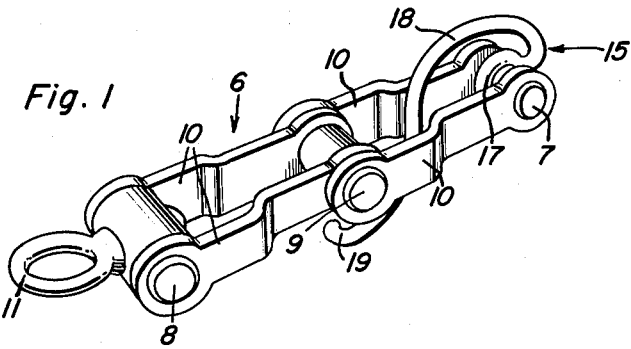
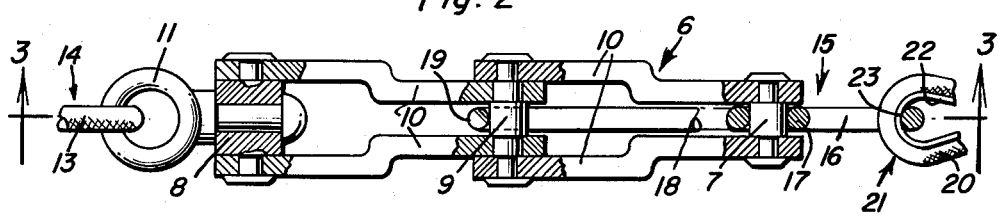
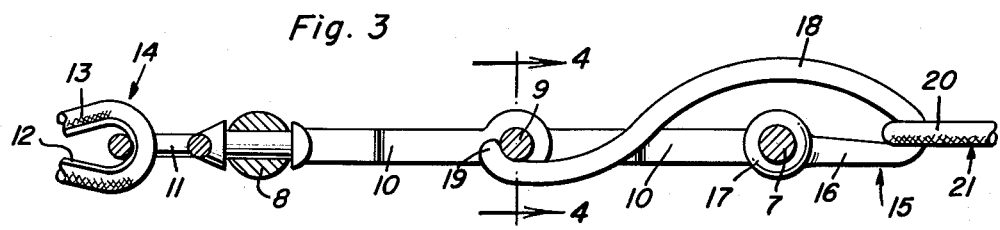
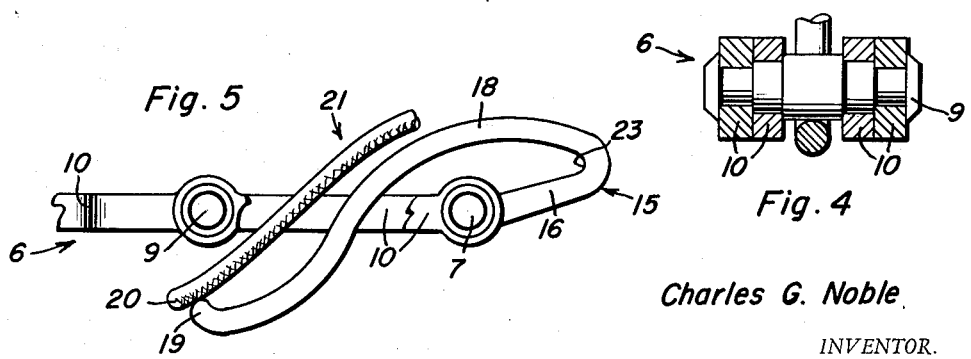
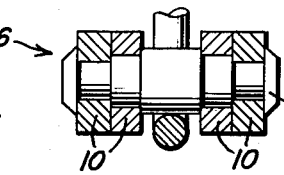
Charles G. Noble
INVENTOR.

United States Patent Office 3,137,049
Patented June 16, 1964

3,137,049
CABLE CONNECTOR
Charles G. Noble, Star Rte., Box 471, Westfir, Oreg.
Filed Dec. 4, 1962, Ser. No. 242,151
3 Claims. (Cl. 24—73)

This invention relates to new and useful improvements in connectors particularly but by no means necessarily, for various uses in the logging and lumbering industries and has for its primary object to provide, in a manner as hereinafter set forth, novel means whereby wire ropes or cables, etc., may be expeditiously connected to each other or to various objects with a minimum of effort.

Another highly important object of the present invention is to provide an improved connector of the aforementioned character comprising a pivoted hook engageable in an end loop on the rope, wherein said hook is closed and retained in closed position by the pull of the rope thereon.

Other objects of the invention are to provide an improved wire rope or cable connector which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of a connector constructed in accordance with the present invention;

FIGURE 2 is a plan view thereof with portions broken away in section;

FIGURE 3 is a vertical longitudinal sectional view, taken substantially on the line 3—3 of FIGURE 2;

FIGURE 4 is a view in transverse section on an enlarged scale, taken substantially on the line 4—4 of FIGURE 3; and FIGURE 5 is a fragmentary view in side elevation with a portion broken away to show the method of engaging the hook in the wire rope loop.

Referring now to the drawing in detail, it will be seen that the embodiment of the invention which has been illustrated comprises a short section of chain of suitable metal which is designated generally by reference numeral 6. The chain 6, which may also be of any desired dimensions, includes front, rear and intermediate pins 7, 8 and 9, respectively, having pivotally mounted on the ends thereof connecting links 10.

A swivel 11 is mounted on the end pin 8. In the embodiment shown, the swivel 11 is engaged in a thimble 12 in an end loop 13 of a wire rope or cable 14. Thus, the chain 6 is swivelly mounted on one end of the wire rope 14.

A hook 15 is pivotally mounted on the end pin 7. Toward this end, the hook 15 comprises a shank 16 having on one end an integral eye 17 which is journaled on the pin 7. At its other end, the shank 16 is substantially reversely bent and bowed outwardly to provide an elongated bill 18. The bill 18 terminates in a reversely bent free end portion or anchoring hook 19 which, when the hook 15 is in closed position as shown in FIGURE 3 of the drawing, is engaged with the intermediate pin 9 of the chain 6. The hook 15 is engageable in a loop 20 on one end of a cable 21 to be connected. Reference numeral 22 designates a thimble in the loop 20 in which the hook 15 is engaged.

It is thought that the use or operation of the connector will be readily apparent from a consideration of the foregoing. Briefly, to engage the loop 20 in the hook 15, the bill 18 of said hook is swung downwardly to the position of FIGURE 5 of the drawing thus disengaging the end portion 19 of said bill from the intermediate pin 9. The loop 20 is then inserted downwardly through the chain 6 and slipped on the bill 18, 19 of the hook 15. If desired, the thimble 22 may be omitted to facilitate engaging the cable loop with the hook. The loop 20 is then engaged in the crotch or seat 23 defined at the junction of the shank 16 and the bill 18 of the hook 15. The load on the hook 15 swings the shank 16 thereof substantially into longitudinal alignment with the chain 6 and engages the end portion 19 of the bill 18 with the intermediate pin 9 thus closing the hook for retaining the loop 20 therein in an obvious manner. Of course, to disconnect the rope or cable the foregoing procedure is substantially reversed. The chain 6 provides flexibility in the connector and the swivel 11 prevents twisting, as will be apparent. While, as hereinbefore indicated, the device is intended primarily for use in conjunction with wire ropes, said device may also be used in connection with manila and other ropes, chains and for any other purpose for which it may be found adapted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cable connector comprising a first pair of spaced parallel links, a first pin extending between and interconnecting the links at one end thereof, a second pin extending between and interconnecting the links at the other end thereof, a second pair of spaced parallel links, said second pair of links being mounted at one end on said second pin, a third pin extending between and interconnecting the second pair of links at the other end thereof, a hook, said hook including a first substantially straight portion, said first portion being pivotally mounted at one end to the first pin so as to project longitudinally beyond the first pair of links, said hook at a second end of the first portion remote from the first pin being reversely bent so as to form a cable seat alignable substantially along the longitudinal axis of the connector, a second hook portion, said second portion being integral with the seat and extending rearwardly in an arcuate path over the first pin downwardly between the links of the first pair of links and rearwardly beneath the second pin whereby upward rotational movement of the second portion is limited by engagement with said second pin so as to require the insertion of a cable end loop between the links of the first pair of links prior to engagement over the hook, said seat being positioned substantially along the longitudinal axis of the connector when the second portion of the hook is engaged with the second pin, and a connecting means secured to said third pin and projecting outwardly therefrom.

2. The structure of claim 1 wherein said last mentioned means consists of a swivel.

3. The structure of claim 1 wherein said second pair of links is rotatably mounted on the second pin.

References Cited in the file of this patent

UNITED STATES PATENTS

| | | |
|---|---|---|
| 827,795 | Foucher | Aug. 7, 1906 |
| 884,415 | Silvers et al. | Apr. 14, 1908 |
| 1,352,339 | Anderegg | Sept. 7, 1920 |
| 1,866,889 | Heineckle | July 12, 1932 |
| 2,500,488 | Durbin et al. | Mar. 14, 1950 |

FOREIGN PATENTS

| | | |
|---|---|---|
| 164,581 | Australia | Aug. 15, 1955 |
| 1,028,239 | France | Feb. 25, 1953 |